United States Patent [19]

Junemann et al.

[11] Patent Number: 5,217,337
[45] Date of Patent: Jun. 8, 1993

[54] TWO-PART FASTENING DEVICE FOR PROTECTIVE STRIPS

[75] Inventors: Dietrich Junemann, Lorrach; Friedrich Silbereisen, Efringen-Kirchen, both of Fed. Rep. of Germany

[73] Assignee: A. Raymond AG, Lorrach, Fed. Rep. of Germany

[21] Appl. No.: 886,834

[22] Filed: May 22, 1992

[30] Foreign Application Priority Data

May 25, 1991 [DE] Fed. Rep. of Germany ....... 4117114

[51] Int. Cl.$^5$ ................... F16B 13/06; F16B 19/00; E04F 19/02; A44B 1/04
[52] U.S. Cl. ........................ 411/45; 411/41; 411/508; 411/913; 24/297
[58] Field of Search ............ 411/40, 41, 45, 49, 411/508–510, 908, 913, 48; 24/297, 453

[56] References Cited

U.S. PATENT DOCUMENTS

| | | | |
|---|---|---|---|
| 3,063,114 | 11/1962 | Perrochat | 24/297 |
| 3,110,068 | 11/1963 | Perrochat | 24/297 |
| 4,176,428 | 12/1979 | Kimura | 24/297 X |
| 4,235,147 | 11/1980 | Weidner, Jr. | 411/542 |
| 4,431,355 | 2/1984 | Junemann | 411/508 X |
| 4,648,766 | 3/1987 | Wollar | 411/45 |
| 4,821,381 | 4/1989 | Kaneko et al. | 24/297 |

FOREIGN PATENT DOCUMENTS 1475141 7/1969 Fed. Rep. of Germany ........ 24/297
3114283A1 11/1982 Fed. Rep. of Germany .

Primary Examiner—Neill R. Wilson
Attorney, Agent, or Firm—Finnegan, Henderson, Farabow, Garrett & Dunner

[57] ABSTRACT

A two-part fastening clip made of a hard-elastic plastic material for fastening a piece of molding to a panel. The device includes an upper part having a cover plate, with the molding being secured to one side of the cover plate, a stopper element that extends perpendicularly out from an opposite side of the cover plate in a direction away from the molding and a bulge on its free end that tapers conically in both its axial directions. The device also includes a lower part that can be anchored in a hole in the panel and has a socket casing having a through opening therein for receipt of the stopper element of the upper part and a constricted edge in the opening behind which the bulge of the stopper engages to lock the two parts together. A first flexible sealing diaphragm on the lower part seals against the panel when the lower part is anchored to the panel to seal off the hole in the panel and a second flexible sealing diaphragm extending in a direction opposite from the first diaphragm seals against the cover plate of the upper part when the stopper is inserted into the opening in the socket casing and the bulge on the stopper is engaged behind the constricted edge of the opening to seal off the opening in the casing.

4 Claims, 1 Drawing Sheet

TWO-PART FASTENING DEVICE FOR PROTECTIVE STRIPS

BACKGROUND OF THE INVENTION

This invention relates to a two-part fastening device or clip made from a hard-elastic plastic material for fastening protective strips or decorative moldings to bearer plates or trim panels, such as, for example, the body panels of a motor vehicle.

A known fastening device of this type is shown, for example, in German Patent 31 14 283 A1. This device includes an upper part, which is connectable to the protective strip, and lower part having a downwardly opening socket, which can be inserted into a hole in the panel and fixed to the edge of the hole by means of elastically yielding locking elements. The lower part is elastically sealed with respect to the panel by a sealing diaphragm. The upper part includes a cover plate that is insertable into the protective strip, and a stopper that extends out perpendicularly from the cover plate for insertion into the socket of the lower part. The stopper has a bulge on its free end that tapers conically in both axial directions, and the socket of the lower part has an opening, constricted in relation to the stopper, through which the bulge of the stopper extends and locks behind to hold the upper part in the lower part.

This known type of fastening device is usually first inserted into the protective strip in a pre-assembled state, and then the protective strip is fastened to the bodywork panel by pressing the socket of the lower part into a hole in the panel until the locking elements engage behind the edge of the hole.

The fastening principle behind this type of device makes it relatively easy to use, but it has the critical disadvantage that water can easily penetrate between the strip and the bodywork and from there it is able to penetrate unhindered through the opening in the socket, which is open at both ends and get behind the panel to which the strip is affixed. This sooner or later is bound to lead to corrosion at various locations of the non-protected panel. In view of the current demand of motor vehicle owners to eliminate corrosion problems, this type of clip is no longer generally acceptable.

An object of the present invention therefore is to provide a fastening device of the type described that prevents water from penetrating into the fastening holes in the body panel.

SUMMARY OF THE INVENTION

This object is achieved according to the present invention by providing a two-part fastening device made of a hard-elastic plastic material for fastening an object to a panel, comprising an upper part, said upper part comprising a cover plate, means for securing said object to one side of said cover plate, a stopper element that extends perpendicularly out from an opposite side of said cover plate in a direction away from said object and a bulge on the free end of said stopper element that tapers conically in both axial directions of said stopper and a lower part, said lower part comprising a socket casing having a through opening therein for receipt of the stopper element of said upper part, means for anchoring said lower part in a hole in said panel, a constricted edge in said opening through which said bulge of the stopper first extends and then engages behind to lock said upper and lower parts together, a first flexible sealing diaphragm on said lower part that seals against said panel when the lower part is anchored in said panel to seal off the hole in said panel and a second flexible sealing diaphragm on said lower part extending in a direction opposite from said first diaphragm that seals against said opposite side of said cover plate when said stopper is inserted into the opening of the socket casing of the lower part and the bulge on the stopper is engaged behind the constricted edge of said opening to seal off the opening in the socket casing.

As a result of this, the fastening hole in the body panel as well as the opening in the socket casing and hence the space behind the body panel and between it and the interior cladding of a motor vehicle are effectively sealed off from the area accessible by the water between the object mounted to the panel, such as a protective or decorative strip, and the panel.

A precondition for this is, of course, that the cover plate be somewhat wider than the diameter of the second sealing diaphragm, which can simultaneously be configured, according to a further feature of the invention, as a feed funnel for the opening in the socket casing of the lower part.

BRIEF DESCRIPTION OF THE DRAWINGS

An embodiment of the invention is shown in the drawings and will be explained in further detail below.

DETAILED DESCRIPTION OF THE INVENTION

Figure 1:
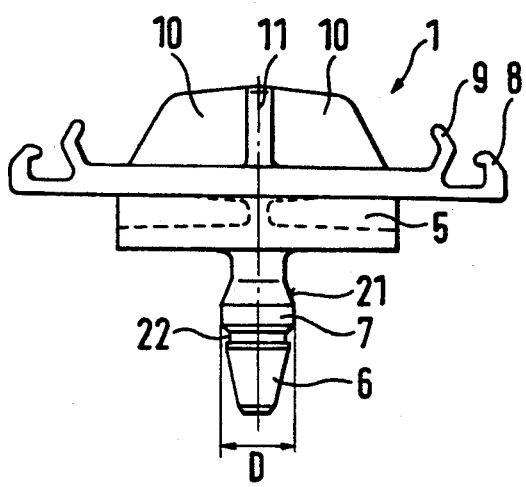
FIG. 1 shows the upper part of the two-part fastening device of this invention in side view.

The fastening device or clip shown in the drawings includes an upper part 1 and a lower part 2 connectable thereto.

Figure 5:
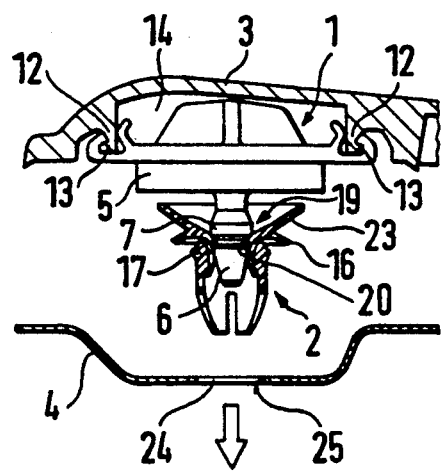
FIG. 5 shows the fastening device with the lower part pre-fitted on to the stopper of the upper part and a protective strip mounted on the upper part and poised over the fastening hole in a panel.
Figure 6:
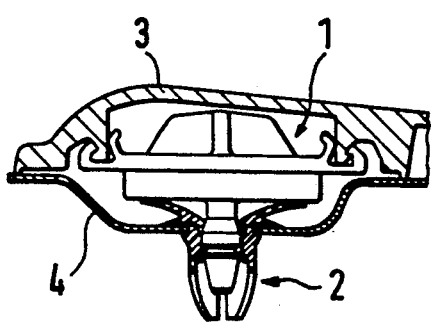
FIG. 6 shows the fastening device with the protective strip in place mounted to the panel.

As can be seen in FIGS. 5 and 6, the upper part of the device serves as a clip for mounting an object such as a longitudinally extending protective strip or decorative molding 3, which is intended to be fastened by means of the device to a bearer plate 4, for example, the body panel of a motor vehicle.

Figure 2:
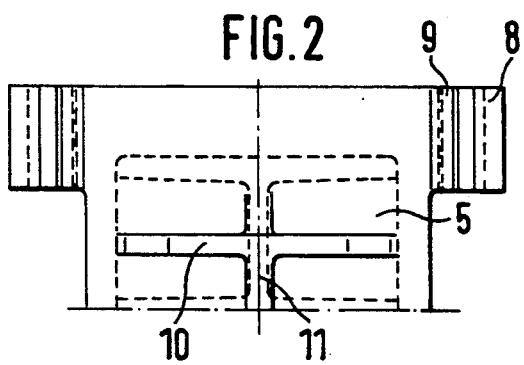
FIG. 2 shows half the length of the upper part from the top.

Upper part 1, shown enlarged in FIGS. 1 and 2, includes a cover plate 5, which can be inserted into the protective strip 3, and a stopper element 6, which extends perpendicularly out from the cover plate 5 and has a bulge 7 on its free end that tapers conically in both of its axial directions. Cover plate 5 is essentially rectangular in configuration when viewed from the top and has in the middle thereof, supporting ribs 10 and 11, and at each of its four corners means for securing the strip to the cover plate. As embodied, this means comprises two clamping legs 8 and 9 that cooperate with two holding webs 12 on the underside of strip 3 that extend in the longitudinal direction of the strip and have outwardly projecting locking-edges 13, so that they can be pressed into place and locked between clamping legs 8 and 9 of cover 5. Between holding webs 12 of strip 3 is a recess 14, into which, once the locking-edges 13 have been pressed into the clamping legs 8 and 9, fit the ribs 10 and 11 of the cover plate 5, so that they come up against the inner wall of the protective strip 3. In this way, the strip is supported from behind so that when pressure is exerted on the protective strip 3 during assembly, it will be transmitted via the ribs 10 and 11 and the stopper 6 onto the lower part 2.

Figure 3:
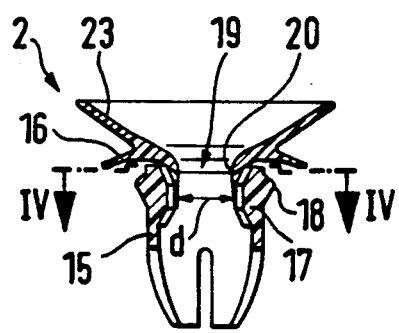
FIG. 3 shows the associated lower part of the device in section.
Figure 4:
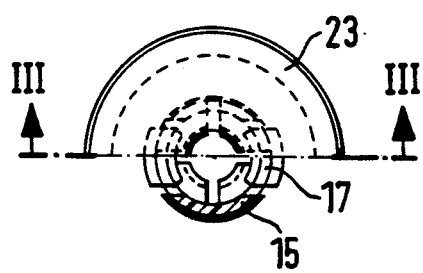
FIG. 4 shows the lower part in top view with a partial section through the socket casing.

Lower part 2 shown in FIGS. 3 and 4 has an annular socket casing 15, sized so that it can be inserted into a fastening hole 24 in bearer plate 4 and which converges in slightly curved form in the direction of insertion. The socket casing has on its outer surface a first annular sealing diaphragm or flange 16 formed integral therewith that flares outwardly and downwardly so that it will seal against plate 4 to seal off the hole 24 and means for anchoring the lower part in the hole. As embodied, this means comprises two elastically yielding locking elements 17 with locking bosses 18, located below sealing diaphragm 16. When part 2 is pressed into fastening hole 24 in plate 4, the locking elements will engage behind the edge 25 of the hole with their outwardly jutting locking bosses 18, so that the lower part will be tightly fixed to the plate 4.

In the middle of the socket casing 15 is a funnel-shaped, converging opening 19 for passage of stopper 6 of the upper part 1. This opening 19 has a constricted edge 20, which is narrower than the bulge 7 of the stopper. The diameter "d" of the constriction is coordinated with the diameter "D" of the bulge 7 of the stopper 6 so that the bulge will initially elastically dilate constriction 20 when the stopper is pressed into the opening 19. The constricted edge 2 will then contract after the bulge 7 of the stopper 6 has passed by it and will rest against the upper conically tapering surface 21 of bulge 7 of stopper 6, as shown in FIG. 6.

Below bulge 7, stopper 6 has a circumferential groove 22, into which the constricted edge 20 is engaged when the fastening device has been preassembled to hold it together for delivery (FIG. 5), but before it has been mounted to the body panel.

In accordance with the invention, to prevent spray water or rainwater that invariably penetrates between protective strip 3 and panel 4 from entering through the opening 19 in socket casing 15 and into the space behind the panel, there is provided above constricted edge 20, a second annular sealing diaphragm or flange 23, that flares outwardly and upwardly in a direction opposite from first sealing diaphragm 16. As shown in FIG. 6, this diaphragm bears against cover plate 5 in a seal-tight manner, whenever stopper bulge 7 is engaged behind edge 20 of socket casing 15 to seal off the opening 19. In addition, this second sealing diaphragm 23 also forms a feed funnel for the opening 19, so that the stopper 6 can be more readily introduced without difficulty into the opening 19 of lower part 2.

What is claimed is:

1. A two-art fastening device made of a hard-elastic plastic material for fastening an object to a panel, comprising an upper part, said upper part comprising a cover plate, means for securing said object to one side of said cover plate, a stopper element that extends perpendicularly out from an opposite side of said cover plate in a direction away from said object and a bulge on the free end of said stopper element that tapers conically in both axial directions of said stopper and a lower part, said lower part comprising a socket casing having a through opening therein for receipt of the stopper element of said upper part, means for anchoring said lower part in a hole in said panel, a constricted edge in said opening through which said bulge of the stopper first extends and then engages behind to lock said upper and lower parts together, a first annular sealing flange integral with said lower part that flares outwardly and downwardly from the outside of said socket casing and seals against said panel when the lower part is anchored in said panel to seal off the hole in said panel and a second annular sealing flange integral with said lower part that flares outwardly and upwardly from the outside of said socket casing in a direction opposite from said first flange and that seals against said opposite side of said cover plate of the upper part when said stopper is inserted into the opening of the socket casing of the lower part and the bulge on the stopper is engaged behind the constricted edge of said opening to seal off the opening in the socket casing.

2. The fastening device of claim 1, adapted to secure a longitudinally extending molding to said panel.

3. The fastening device of claim 2, wherein the first sealing flange flares outwardly and downwardly from a location adjacent said constricted edge of the opening in the socket casing and the second sealing diaphragm flares outwardly and upwardly from said location, said opposite side of the cover plate of the upper part against which the second flange seals being parallel to said panel when the device is anchored to the panel.

4. The fastening device of claim 3, wherein the second sealing flange is a continuation of the opening in said socket casing of the lower part forming a funnel for guiding said stopper element into said opening.

* * * * *